Aug. 23, 1932.   G. L. PIERCE   1,873,904
SHOE CLEAT
Filed March 23, 1931

Inventor:
George L. Pierce,
By Spear, Donaldson & Hall
Attys.

Patented Aug. 23, 1932

1,873,904

UNITED STATES PATENT OFFICE

GEORGE L. PIERCE, OF BROOKLYN, NEW YORK, ASSIGNOR TO A. G. SPALDING & BROS., OF NEW YORK, N. Y., A CORPORATION OF NEW JERSEY

SHOE CLEAT

Application filed March 23, 1931. Serial No. 524,713.

The invention relates to that general type of shoe cleat organization in which the cleat proper is composed of hard rubber or other suitable material such as vulcanite, or fibre having embedded therein a member provided with a screw threaded shank projecting from the said cleat to engage a nut or screw threaded socket member mounted in the outer sole of the shoe. One object of the invention is to provide a reliable connection between the cleat proper and the member anchored therein which, while affording extensive surface engagement between the material of the cleat proper and said member will leave a considerable thickness of the body of the cleat surrounding the said member with the result that the strength of the cleat proper will be maintained in a large degree and liability of the member breaking through the wall of the cleat will be avoided.

The invention consists in the features and combination of parts hereinafter described and particularly pointed out in the claims.

In the accompanying drawing

Figure 1:
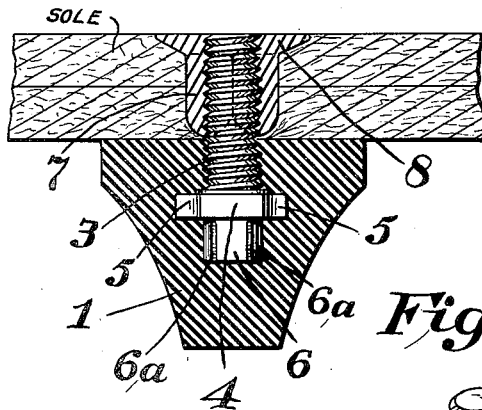
Figure 1 is a sectional view of the invention applied to the sole of the shoe.

In the drawing the cleat proper is shown at 1. This is of the general shape of a truncated cone. It may be formed of hard rubber or other material. Its base face 2 is slightly concaved. Within this cleat member an attaching member is anchored by molding the material of the cleat about the same. This member consists of a screw threaded shank 3 having a head 4 in the form of a flange of substantial thickness.

The head is of general rectangular form though modified from this general shape as will now be referred to. As above stated this head or flange is of substantial thickness. It presents therefore a considerable surface area on its side faces for contact with the body material of the cleat. Instead of having these side faces continued so as to meet at a sharp corner I form recesses or indents 5 at the regions of the corners into which the body material extends to form an interlock between said head and said cleat, which will resist tendency of the cleat to turn about the head. Furthermore, this formation of the head with the recesses located as shown cuts off the corners which otherwise would exist on the head at this point and thus a considerable thickness of stock of the cleat proper is left between the side face of the head and the outer surface of the cleat body. This provides a strong construction of the cleat proper and removes the liability of the head of the fastening device breaking through the wall of the cleat at the points where the square corners otherwise would exist with a much thinner wall portion of the cleat proper surrounding said corner. The extent of surface contact between the rubber of the cleat and the head is maintained nearly if not quite equal to that which would exist if the head of the fastening device had its side faces meeting in a sharp corner. This substantial maintenance of the surface contact being due to the re-entrant character of the recesses into which the body material of the cleat proper extends. The recesses may be of various forms but in the particular form shown the recesses are curved and they may be conveniently made by a curved cutter. It will be understood that cleats of the character disclosed herein are subject to great strains tending to bend or flex them laterally and it is my object to provide a substantial anchorage of the fastening device within the cleat and yet maintain a substantial thickness of the wall of the cleat about the head of the fastening device and this is accomplished by the recessed formation of the head at the corners thereof. The head has an integral projection 6 extending below it into the body of the cleat proper which aids in resisting lateral strains. The screw threaded shank of the fastening device projects beyond the cleat proper and is screwed into a nut or socket member 7 mounted in the sole of the shoe. This socket member is screw threaded interiorly. It has a flange 8 to bear on the sole and its body portion is rectangular in cross section to prevent turning in the sole. The recessed head is also integral with the shank.

The integral projection 6 is provided with longitudinally extending indents or recesses 6a into which the material of the cleat extends to enhance the security of the contact between the cleat material and said extension.

Figure 2:
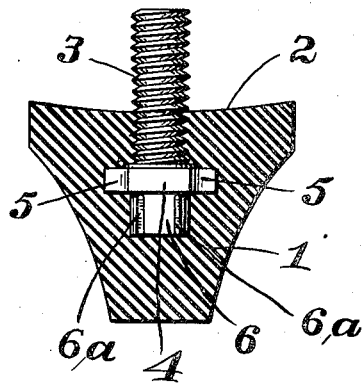
Figure 2 is a side view of the attaching member which is embedded in the cleat.
Figure 3:
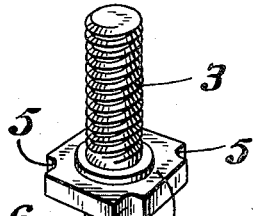
Figure 3 is a perspective view of said member.
Figure 4:
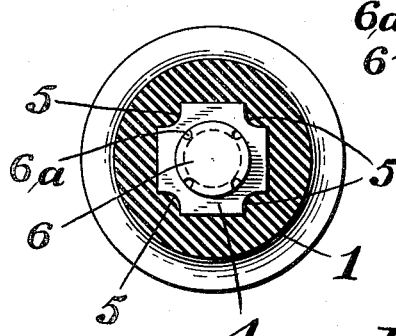
Figure 4 is a plan view of said member.
Figure 6:
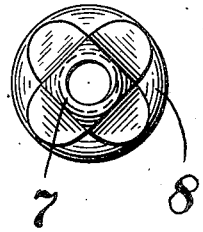
Figure 6 is a bottom plan view of said socket member.
Figure 5:
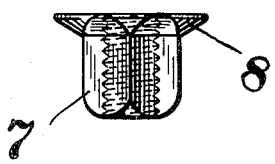
Figure 5 is a side view of the nut or socket member.

It will be noted that the distance from the screw shank to the outer face of the square head measured along a line at right angles to the side face of the head is approximately the same as the distance measured along the diagonal of the head or along the line from the screw shank to the bottom of the recess 5, so that despite the fact that the head is generally of the shape of a square, the rubber stock comes as close to the shank at the recesses as it does at points along the side face of the square shaped head between the notches. By reason of my construction I can use a cleat of the sharply tapered formation shown in Figs. 1 and 2 to get an easy penetration into the ground and the configuration of the cleat may be generally concaved as shown, and a substantial amount of stock will be left at all points around the head.

By reason of my construction very substantial portions of the stock are made to engage in the recesses or notches to resist any tendency for the cleat and the anchor to be displaced relative to each other. The recesses or notches provide shoulders which extend inwardly from the sides of the head and which contact with those portions of the cleat in the recesses or notches. Owing to the general rectangular formation of the head, the sides of the head are long, and the upper and lower faces of the head are continuous and completely surround the shank. The long sides of the head cooperate with the shoulders to hold the cleat against turning movement on the shank, and the continuous faces of the head hold the cleat against axial displacement with relation to the shank, without tendency to cut the cleat. Due thereto the cleat, which is secured to the shoe by turning the shank into the socket member through the medium of the cleat, may be firmly secured to the shoe without danger of loosening the connection between the cleat and the shank.

I claim:

1. A cleat for a shoe comprising a body of rubber or the like, and a fastening shank having a head of general rectangular form embedded in the body, the head having continuous upper and lower faces completely surrounding the shank and adapted to positively hold the shank and body against relative axial displacement without tendency to cut the body, the head having long sides and provided at its corners with shallow recesses receiving portions of the body and presenting shoulders extending inwardly from the ends of said sides, the long sides and the shoulders cooperating to hold the body against turning on the shank without tendency to cut the body, and said recesses providing for a thickness of the material of the body between the corners of the head and the side face of the body substantially equal to that between the sides of the head and the side of the body.

2. A cleat for a shoe, comprising a body of rubber or the like, and a fastening shank having a head of general rectangular form embedded in the body, the head having continuous upper and lower faces completely surrounding the shank and adapted to positively hold the shank and body against relative axial displacement without tendency to cut the body, the head having long sides and provided at its corners with shallow recesses receiving portions of the body and presenting shoulders extending inwardly from the ends of said sides, the long sides and the shoulders cooperating to hold the body against turning on the shank without tendency to cut the body, and said recesses providing for a thickness of the material of the body between the corner of the head and the side face of the body substantially equal to that between the side of the head and the side of the body, and a projection formed integrally with the lower face of the head and adapted to resist lateral strains on the body below the head, and the projection having longitudinally extending recesses adapted to receive portions of the body to assist the shoulders and sides of the head in holding the body against turning movement on the shank.

In testimony whereof I affix my signature.

GEORGE L. PIERCE.